Dec. 13, 1927. 1,652,262
M. WALTER
DUMPING MECHANISM FOR SEMITRAILERS
Filed March 19, 1926 2 Sheets-Sheet 1
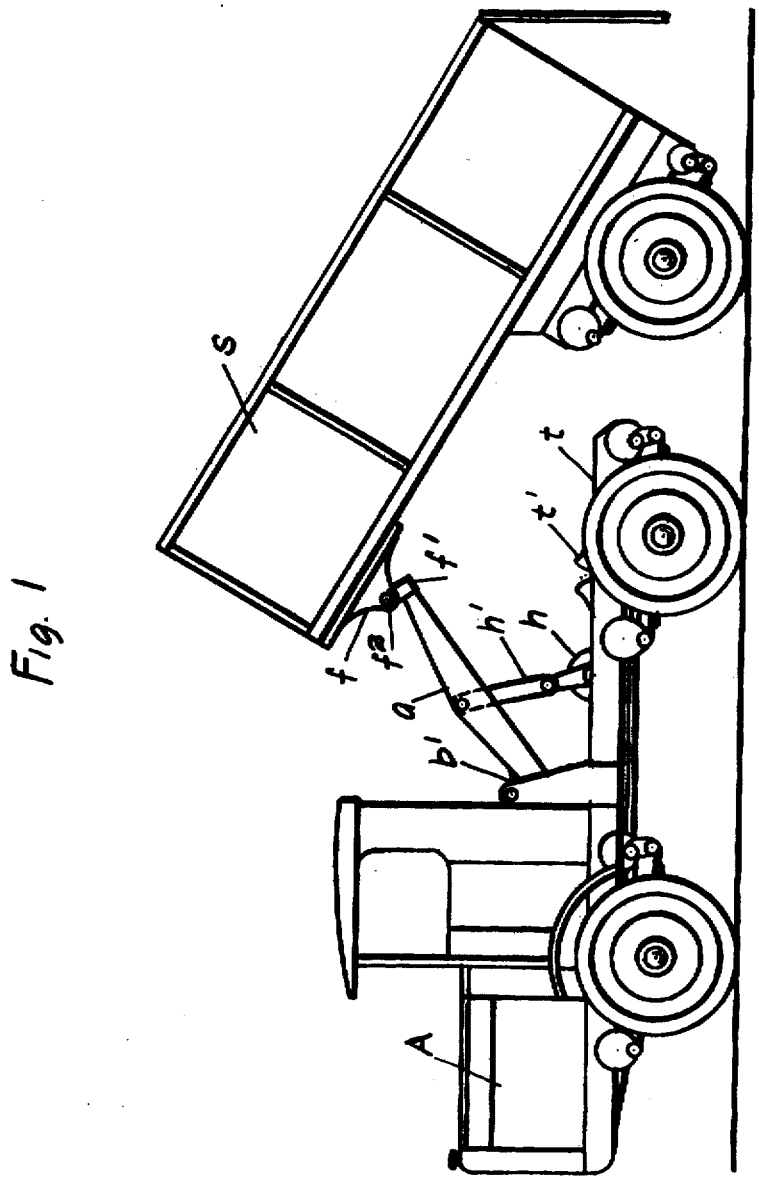

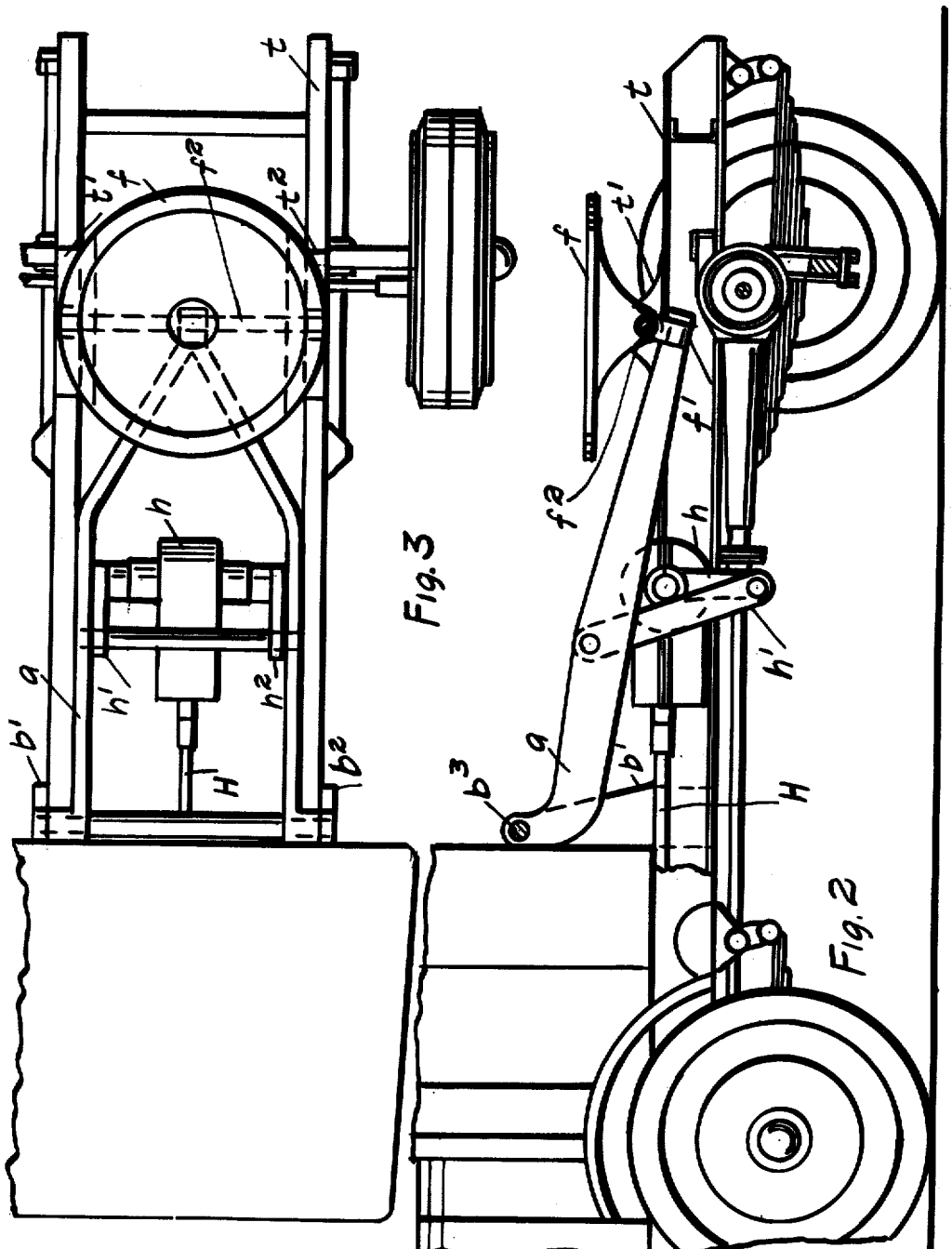

Patented Dec. 13, 1927.

1,652,262

UNITED STATES PATENT OFFICE.

MAURICE WALTER, OF NEW YORK, N. Y.

DUMPING MECHANISM FOR SEMITRAILERS.

Application filed March 19, 1926. Serial No. 95,841.

The use of semi-trailers with tractors offers many advantages. However, semi-trailers to serve their widest usefulness should be capable of being dumped. To design a semi-trailer with special co-operating devices to effect dumping is expensive. however, and entails the kind of investment which it is the principal object of semi-trailers to eliminate. So far as is known, no provision has heretofore been made for dumping semi-trailers when and as desired by means of mechanism mounted wholly on a tractor. The expense of providing dumping mechanism on a tractor is not objectionable and obviously must be incurred if dumping operations are to be carried on but the expense of fitting each and every semi-trailer with duplicate co-operating mechanism for dumping is objectionable because this capital investment is idle when the semi-trailer is idle. By providing dumping mechanism wholly on the tractor duplication of expense as by placing duplicate co-operating mechanism on every semi-trailer is wholly eliminated and the investment once made with respect to the tractor thereafter enables any and every semi-trailer with which the tractor is connected to be dumped when and if desired. The principal object of the present invention is to secure the results indicated by so constructing the dumping mechanism on a tractor as to enable it to effectively operate on a semi-trailer without the provision of any special co-operating mechanism on the semi-trailer. In accordance with the preferred embodiment of the invention the dumping mechanism is directly connected with the fifth wheel on the tractor so that the fifth wheel itself may be elevated for dumping and the semi-trailer body connected therewith is necessarily tilted. In such embodiment no change in the fifth wheel connection as between the semi-trailer and the fifth wheel is contemplated but the fifth wheel itself is so constructed that it may be elevated from the tractor by the dumping mechanism but when in use is positively connected with the tractor frame in such manner as to perform its intended function in the usual way.

Still another object of the present invention is to eliminate the provision of flexible connections and particularly hydraulic connections between a tractor and semi-trailer whereby the expense and injuries usually incidental to such flexible connections are eliminated.

These and other objects of the invention will appear more particularly hereinafter in connection with the detailed description of the preferred embodiment shown in the accompanying drawings, wherein:

Figure 1 is a view in side elevation showing conventionally a tractor and semi-trailer, the latter being indicated in dumping position under the influence of the improved dumping mechanism.

Figure 2 is a view partly in side elevation and partly in longitudinal section through the tractor shown in Figure 1 with the semi-trailer disconnected and the dumping mechanism in lowered or traveling position.

Figure 3 is a fragmentary view in plan of the tractor shown in Figure 2.

The tractor illustrated at A may be of any type arranged for propulsion by any available source of power such as an internal combustion engine. On the frame of this tractor is mounted dumping mechanism also intended to be of any known type and operated by any available source of power. Such dumping mechanism as now known is generally classified as mechanical or hydraulic. That illustrated is mechanical comprising generally an operating gear $h$ driven through a shaft H which may derive its power from the prime mover for the tractor. This gear is connected operatively through links $h'$, $h^2$, with the arms of an A-frame $a$ pivoted as at $b^3$ on brackets $b'$, $b^2$, secured to the chassis. Rotation of the gear $h$ will elevate the A-frame and continued rotation will lower it. The free end of the A-frame carries a link $f'$ hinged thereon and in turn pivotally secured as at $f^2$ to the lower side of the fifth wheel $f$, the pivot $f^2$ being substantially at right angles to the hinge line of the link $f'$.

The principal object of the present invention is to provide for the connection of semi-trailers such as $s$ with a tractor such as A in the conventional way and yet permit dumping mechanism on the tractor to tilt the semi-trailer when and if desired without necessitating the provision of special co-operating dumping means on each semi-trailer. In the illustrated embodiment and in accordance with the invention this highly desirable condition is obtained by securing the fifth wheel $f$ detachably to the chassis of the tractor A so that it may be elevated and lowered by any suitable dumping mechanism such as that described. The semi-trailer s is adapted to be engaged with the fifth wheel f in any suitable or known manner so that its forward end will engage the tractor in such wise as to permit the trailer to be drawn in travel and the tractor to change direction with respect to it whether going forward or backward. Any fifth wheel connection for this purpose may be used. By providing for engagement of the hoisting mechanism with the semi-trailer body it is evident that the hoisting mechanism may be wholly embodied within the tractor. The fullest realization of all of the conditions sought by the present invention is obtained by connecting the fifth wheel to the dumping mechanism since its elevation entails no change in relation of any of the parts with respect to the semi-trailer. It further enables the fifth wheel to be swivelly engaged with the hoisting mechanism for self-alignment during dumping operation regardless of the angular position of the semi-trailer with the tractor.

Inasmuch as the fifth wheel f is adapted to be raised and lowered at will it may be desirable to engage it when in lowered or traveling position through some positive means with the tractor frame so that the traction forces will not be transmitted through the dumping mechanism. Such a simple engagement is afforded by saddle pieces $t'$, $t^2$ disposed on the side frame members of the tractor in such relation to the cross pin $f^3$ as to receive this pin when the fifth wheel is in place. The sides of the saddle pieces $t'$, $t^2$, are inclined to facilitate engagement and disengagement of the pin therewith and yet facilitate lateral bearing between the pin and saddle pieces for transmission of traction forces between the tractor and semi-trailer.

It will be evident from the aforegoing description that the invention is not to be limited to the design of the units described herein since the means employed may be changed through wide limits, the essence of the invention residing in the provision of dumping mechanism wholly on the tractor and adapted to tilt any semi-trailer without special provision thereon for such dumping.

What I claim is:

1. In combination with a tractor and semi-trailer, dumping mechanism carried wholly on the tractor, a fifth wheel universally connected to the dumping mechanism and a complementary connection for the fifth wheel on the trailer.

2. In combination with a tractor and semi-trailer, dumping mechanism mounted wholly on the tractor, a fifth wheel connection between the tractor and semi-trailer, one element of which is carried on the tractor and connected with the dumping mechanism and the co-operating element of which is carried on the trailer, and means between the fifth wheel connection and the dumping mechanism affording capacity for universal movement of the fifth wheel during dumping.

3. In combination with a tractor and semi-trailer, dumping mechanism carried wholly on the tractor, a fifth wheel universally connected to the dumping mechanism and a complementary connection for the fifth wheel on the trailer, and means on the tractor for engaging the fifth wheel and holding it against universal movement when in lowered position.

4. In combination with a tractor and trailer, hoisting mechanism disposed wholly on the tractor and including a hinged A-frame, a fifth wheel universally connected to the hoisting mechanism and a complementary connection for the fifth wheel on the trailer.

This specification signed this 17th day of March A. D. 1926.

MAURICE WALTER.

of the tractor A so that it may be elevated and lowered by any suitable dumping mechanism such as that described. The semi-trailer s is adapted to be engaged with the fifth wheel f in any suitable or known manner so that its forward end will engage the tractor in such wise as to permit the trailer to be drawn in travel and the tractor to change direction with respect to it whether going forward or backward. Any fifth wheel connection for this purpose may be used. By providing for engagement of the hoisting mechanism with the semi-trailer body it is evident that the hoisting mechanism may be wholly embodied within the tractor. The fullest realization of all of the conditions sought by the present invention is obtained by connecting the fifth wheel to the dumping mechanism since its elevation entails no change in relation of any of the parts with respect to the semi-trailer. It further enables the fifth wheel to be swivelly engaged with the hoisting mechanism for self-alignment during dumping operation regardless of the angular position of the semi-trailer with the tractor.

Inasmuch as the fifth wheel f is adapted to be raised and lowered at will it may be desirable to engage it when in lowered or traveling position through some positive means with the tractor frame so that the traction forces will not be transmitted through the dumping mechanism. Such a simple engagement is afforded by saddle pieces $t'$, $t^2$ disposed on the side frame members of the tractor in such relation to the cross pin $f^3$ as to receive this pin when the fifth wheel is in place. The sides of the saddle pieces $t'$, $t^2$, are inclined to facilitate engagement and disengagement of the pin therewith and yet facilitate lateral bearing between the pin and saddle pieces for transmission of traction forces between the tractor and semi-trailer.

It will be evident from the aforegoing description that the invention is not to be limited to the design of the units described herein since the means employed may be changed through wide limits, the essence of the invention residing in the provision of dumping mechanism wholly on the tractor and adapted to tilt any semi-trailer without special provision thereon for such dumping.

What I claim is:

1. In combination with a tractor and semi-trailer, dumping mechanism carried wholly on the tractor, a fifth wheel universally connected to the dumping mechanism and a complementary connection for the fifth wheel on the trailer.

2. In combination with a tractor and semi-trailer, dumping mechanism mounted wholly on the tractor, a fifth wheel connection between the tractor and semi-trailer, one element of which is carried on the tractor and connected with the dumping mechanism and the co-operating element of which is carried on the trailer, and means between the fifth wheel connection and the dumping mechanism affording capacity for universal movement of the fifth wheel during dumping.

3. In combination with a tractor and semi-trailer, dumping mechanism carried wholly on the tractor, a fifth wheel universally connected to the dumping mechanism and a complementary connection for the fifth wheel on the trailer, and means on the tractor for engaging the fifth wheel and holding it against universal movement when in lowered position.

4. In combination with a tractor and trailer, hoisting mechanism disposed wholly on the tractor and including a hinged A-frame, a fifth wheel universally connected to the hoisting mechanism and a complementary connection for the fifth wheel on the trailer.

This specification signed this 17th day of March A. D. 1926.

MAURICE WALTER.

DISCLAIMER 1,652,262.—*Maurice Walter*, New York, N. Y. DUMPING MECHANISM FOR SEMI-TRAILERS. Patent dated December 13, 1927. Disclaimer filed April 18, 1931, by the *patentee*.

Hereby enters this disclaimer to claim 2 of the said patent which is in the following words, to wit:

"In combination with a tractor and semi-trailer, dumping mechanism mounted wholly on the tractor, a fifth wheel connection between the tractor and semi-trailer, one element of which is carried on the tractor and connected with the dumping mechanism and the co-operating element of which is carried on the trailer, and means between the fifth wheel connection and the dumping mechanism affording capacity for universal movement of the fifth wheel during dumping."

[*Official Gazette May 5, 1931.*]

DISCLAIMER 1,652,262.—*Maurice Walter*, New York, N. Y. DUMPING MECHANISM FOR SEMI-TRAILERS. Patent dated December 13, 1927. Disclaimer filed April 18, 1931, by the *patentee*.

Hereby enters this disclaimer to claim 2 of the said patent which is in the following words, to wit:

"In combination with a tractor and semi-trailer, dumping mechanism mounted wholly on the tractor, a fifth wheel connection between the tractor and semi-trailer, one element of which is carried on the tractor and connected with the dumping mechanism and the co-operating element of which is carried on the trailer, and means between the fifth wheel connection and the dumping mechanism affording capacity for universal movement of the fifth wheel during dumping."

[*Official Gazette May 5, 1931.*]